United States Patent [19]

Klinger

[11] Patent Number: 4,469,724
[45] Date of Patent: Sep. 4, 1984

[54] METHOD OF PROTECTING OPTICAL FIBRE AGAINST STRESS CORROSION

[75] Inventor: Liliana Klinger, Wall, N.J.

[73] Assignee: The United States of America as represented by the Secretary of the Army, Washington, D.C.

[21] Appl. No.: 508,957

[22] Filed: Jun. 29, 1983

[51] Int. Cl.³ ............................................. B05D 3/06
[52] U.S. Cl. .................................... 427/54.1; 427/44; 427/163
[58] Field of Search .......................... 427/44, 54.1, 163

[56] References Cited

U.S. PATENT DOCUMENTS 4,284,747 12/1983 Griffith et al. ...................... 525/530
4,324,575 4/1982 Levy .................................. 427/54.1
4,388,093 6/1983 Kimura et al. ..................... 427/54.1

Primary Examiner—John H. Newsome
Attorney, Agent, or Firm—Anthony T. Lane; Jeremiah G. Murray; Roy E. Gordon

[57] ABSTRACT

Optical fibres are protected against stress corrosion by first coating the optical fibre with a primary coating of an ultra violet curable cis, trans fluoropolyolacrylate in which the modulus is reduced by eliminating about 25 percent of the pendant ester groups, curing the primary coating, applying a secondary coating of a high modulus heat curable fluoroepoxy or a high modulus UV curable cis trans fluoropolyolacrylate over the primary coating and curing the secondary coating.

6 Claims, No Drawings

METHOD OF PROTECTING OPTICAL FIBRE AGAINST STRESS CORROSION

The invention described herein may be manufactured, used and licensed by or for the Government for governmental purposes without the payment to me of any royalty thereon.

This invention relates in general to a method of protecting optical fibre against stress corrosion and in particular to such a method wherein particular organic polymer coatings are employed.

BACKGROUND OF THE INVENTION

Organic polymer coatings play a critical role in determining the overall performance of optical fibers. They protect the very fine silica glass fiber from abrasive damage and environmental effects, such as stress induced corrosion. In addition, they act as a buffer in reducing the sensitivity of the optical fiber to microbending loss. Stress induced corrosion by water is associated with stress concentrations at surface flaws under deformation. Regions of the surface of a glass fiber subject to contact with liquid water or water vapor at relatively high partial pressure are subject to surface hydrolysis of silicate bonds. These chemically damaged centers can act as nucleation sites for Griffith cracks which propagate with the local sound velocity into the interior of the fiber when subjected to external stresses. Polymer coatings for optical fibers must thus reduce permeation of water through the polymer matrix as well as reduce stress concentrations at surface flaws.

SUMMARY OF THE INVENTION

The general object of this invention is to provide a method of protecting optical fibre against stress corrosion. A more particular object of the invention is to provide such a method that will substantially reduce permeation of moisture vapor to the glass fiber while acting as a buffer in reducing both stress corrosion and microbending loss. A still further object of the invention is to provide such a method that results in fibers suited for tactical communication and missile guidance systems.

It has now been found that the aforementioned objects can be attained by using a photocured cis, trans fluoropolyolpolyacrylate of reduced crosslink density as a primary coating and a high modulus fluoroepoxy polymer or a high modulus cis, trans fluoropolyolpolyacrylate as a secondary coating.

The foregoing combination of organic polymer coatings strikes a balance between two factors: a soft compliant enclosure that acts as a buffer in masking the nonuniform surface of the glass and a hard enclosure to act as a stiffener and make the fiber reisitant to the environmental surface. A cis, trans fluoropolyolacrylate is a long chain monomer containing aromatic and oxirane rings and corresponds to the formula

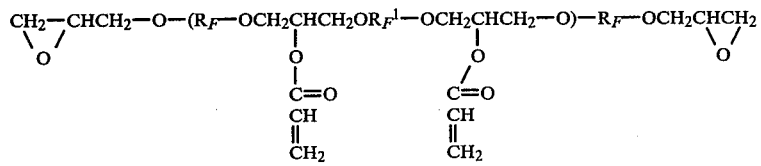

where $R_F$ is

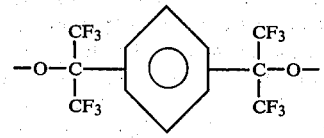

and where RF' is

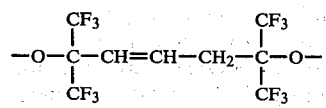

It is particularly described in U.S. Pat. No. 4,284,747 issued Aug. 18, 1981. Photopolymerization occurs through pendant ester groups.

The fluoroepoxy is synthesized by mixing the diglycidyl ether with bis γ-aminopropyl tetramethyl disiloxane at 50° C. until both reactants become mutually soluble. The diglycidyl ether corresponds to the formula

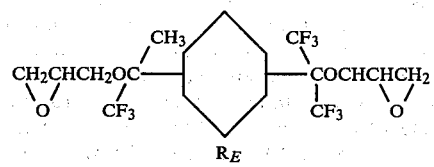

where $R_E$ is $(CH_2)_x CH_3$ and wherein X is 5 or 7. It is particularly described in U.S. Pat. No. 3,879,430 issued Apr. 22, 1975.

In both organic polymer coatings, fluorine is incorporated into the polymer chain as fluoromethyl groups. The $C_8$ fluoroepoxy has an additional fluorinated hexane attached to the aromatic ring. The long chain adds flexibility whereas the aromatic ring gives strength and resiliency.

DESCRIPTION OF THE PREFERRED EMBODIMENT

To protect the optical fibre, it is coated in line and right after it is drawn from a preform. The drawn fibre is then coated in a nitrogen atmosphere with a mixture of an utraviolet (UV) curable cis, trans fluoropolyolacrylate in which the modulus is reduced by eliminating abut 25 percent of the pendant ester groups and an ultraviolet catalyst as for example, azobisisobutyronitrile. (AIBN) The coated fibre is then passed through a UV light source that cures the resin and solidifies it rapidly to form a primary coating of reduced cross link density. The nitrogen atmosphere is maintained until the coating has been cured.

The modulus of the primary coating is reduced to improve its ability to act as a buffer to reduce microbending loss and stress corrosion.

After the primary coat has cured, a secondary coating is applied. This can be fluoroepoxy resin to which a curing agent as for example bis (γ-amino propyl) tetramethyl disiloxane has been added in a ratio of 2:1 epoxy to amine. Heat is then applied to a temperature of about 80° C. to cure the fluoroepoxy. Alternatively, the secondary coating can be a high modulus cis, trans fluoropolyolpolyacrylate cured by exposure to an ultra violet light.

The method of the invention is significant in that heretofore, it has not been suggested to use a fluorinated polymer as a primary coating for an optical fibre. Where fluorinated polymers have been used in the past for wet proofing, the fluorinated compounds have not been amenable to in line coating and UV curing. Moreover, a cis trans fluoropolyolacrylate is a liquid monomer at room temperature that cures very rapidly on irradiation in the presence of a UV catalyst.

The organic polymer coatings have good mechanical properties and incorporate a large amount of fluorine which reduces the moisture vapor permeability of the optical fibre.

Measurements are then made of barrier (moisture vapor permeability) and surface properties as well as modulus to determine the effectiveness of these coatings in reducing stress corrosion as well as microbending losses. Permeability coefficients are of the order of $10^{-12} \text{gcm}^{-2}\text{sec}^{-1}$ cm per mm Hg and diffusion coefficients are of the order of $10^{-10} \text{cm}^2\text{sec}^{-1}$. Solubilities are of the order of $10^{-2} \text{gm/cm}^3$. These values are at least an order of magnitude lower than published values for other materials presently available for coating optical fibres. Elastic modulus of the cis, trans fluoropolyolpolyacrylate and the fluoroepoxy polymer are approximately $10^{10}$ dynes/cm$^2$. This can be adjusted to about $10^8$ dynes/cm$^2$ by reducing the crosslink density of the polymer.

In the method of the invention, a trace amount of ultraviolet catalyst can be added to the cis, trans fluoropolyol acrylate. Similarly, the amount of curing agent that must be added to the fluoroepoxy is in the ratio 2:1 epoxy to curing agent.

I wish it to be understood that I do not desire to be limited to the exact details as described for obvious modifications will occur to a person skilled in the art.

What is claimed is:

1. Method of protecting optical fibre against stress corrosion, said method including the steps of
   (A) drawing the fibre from a preform,
   (B) coating the drawn fibre in line in a nitrogen atmosphere with a mixture of an ultraviolet curable cis, trans fluoropolyolacrylate in which the modulus is reduced by eliminating about 25 percent of the pendant ester groups and ultraviolet catalyst for the cis, trans fluoropolyolacrylate,
   (C) passing the coated fibre through an ultra violet light source to cure the resin and form a primary coating while maintaining the nitrogen atmosphere,
   (D) coating the primary coating with a secondary coating of a member of the group consisting of a high modulus fluoroepoxy to which a curing agent has been added and a high modulus cis, trans fluoropolyolacrylate to which an ultraviolet catalyst has been added, and
   (E) curing the coating of step (D).

2. Method according to claim 1 wherein the secondary coating is cured by applying heat to the high modulus fluoroepoxy.

3. Method according to claim 1 wherein the secondary coating is cured by exposing the high modulus cis, trans fluoropolyolacrylate to ultra violet light.

4. Method according to claim 1 wherein the ultraviolet catalyst is azobisisobutyronitrile.

5. Method according to claim 1 wherein the curing agent added to the fluoroepoxy is bis (γ-amino propyl) tetramethyl disiloxane.

6. Method according to claim 1 wherein the temperature is raised to about 80° C. to cure the fluoroepoxy.

* * * * *